(12) United States Patent
Sternberger (10) Patent No.: US 6,604,355 B1
(45) Date of Patent: Aug. 12, 2003

(54) THRUST REVERSER HOOK LATCH SYSTEM

(75) Inventor: Joe E. Sternberger, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/945,217

(22) Filed: Aug. 31, 2001

(51) Int. Cl.⁷ .................................................. F02K 3/02
(52) U.S. Cl. .............. 60/226.2; 244/110 B; 239/265.29
(58) Field of Search ..................... 60/226.2; 244/110 B; 239/265.25, 265.27, 265.29, 265.31, 265.19

(56) References Cited

U.S. PATENT DOCUMENTS

| | | | |
|---|---|---|---|
| 4,047,682 A | | 9/1977 | Brownhill |
| 4,194,692 A | * | 3/1980 | Dickenson ............. 239/265.33 |
| 4,437,783 A | * | 3/1984 | Halin et al. ................. 60/226.2 |
| 4,914,905 A | | 4/1990 | Dubois et al. |
| 5,120,004 A | | 6/1992 | Matthias |
| 5,243,817 A | | 9/1993 | Matthias |
| 5,257,840 A | * | 11/1993 | Rouzaud ...................... 292/201 |
| 5,310,117 A | | 5/1994 | Fage et al. |
| 5,344,197 A | * | 9/1994 | Rouzaud ...................... 292/201 |
| 5,404,714 A | * | 4/1995 | Davies ....................... 60/226.2 |
| 5,524,431 A | | 6/1996 | Brusson et al. |
| 5,547,130 A | | 8/1996 | Davies |
| 5,735,557 A | * | 4/1998 | Harvey ...................... 60/226.2 |
| 5,915,765 A | | 6/1999 | Sternberger |
| 5,997,054 A | * | 12/1999 | Baudu et al. ................ 292/201 |
| 6,021,636 A | * | 2/2000 | Johnson et al. ............. 60/226.2 |
| 6,026,638 A | * | 2/2000 | Gonidec et al. ............ 60/226.2 |
| 6,145,786 A | * | 11/2000 | Baudu et al. ............ 244/110 B |
| 6,148,607 A | * | 11/2000 | Baudu et al. ............... 60/226.2 |
| 6,216,980 B1 | * | 4/2001 | Baudu et al. ........... 244/110 B |

* cited by examiner

Primary Examiner—Ted Kim
(74) Attorney, Agent, or Firm—Harness, Dickey & Pierce P.L.C.

(57) ABSTRACT

A hook latch antideployment system for a thrust reverser having at least one thrust reverser sleeve that translates between a deployed and stowed positions and a thrust reverser actuation system that translates the thrust reverser sleeve. The thrust reverser has a stationary element that remains stationary with respect to the thrust reverser sleeve when the thrust reverser sleeve translates. The hook latch anti-deployment system has a hook latch a hook member and a latch member. One of the hook and latch members is coupled to the thrust reverser sleeve for translation therewith and the other of the hook and latch members is affixed to the stationary element of the thrust reverser. The hook member engages the latch member when the thrust reverser sleeve is in its stowed position to prevent deployment of the thrust reverser sleeve. The hook latch system further includes a release mechanism coupled to the thrust reverser actuation system that releases the hook member from the latch member when the thrust reverser actuation system is actuated to deploy the thrust reverser sleeve to its deployed position.

8 Claims, 8 Drawing Sheets

THRUST REVERSER HOOK LATCH SYSTEM

FIELD OF THE INVENTION

The present invention relates to thrust reversers for jet engines, and more particularly, to anti-deployment mechanisms for thrust reversers.

BACKGROUND OF THE INVENTION

Jet aircraft, such as commercial passenger and military aircraft, utilize thrust reversers on the aircraft's jet engines to reduce the aircraft's speed after landing. One type of thrust reverser used in modern jet aircraft is the cascade type, described in more detail in U.S. Pat. No. 5,448,884. For ease of reference, the description of the cascade type of thrust reverser is substantially reproduced herein.

Figure 1:
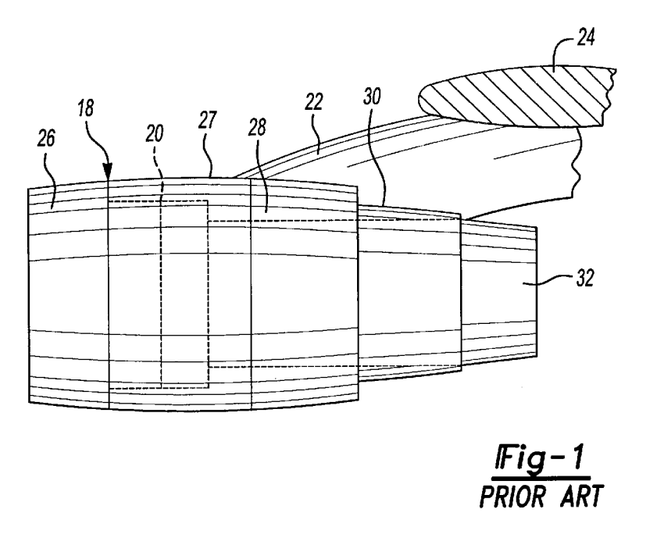
FIG. 1 is a side view of a conventional nacelle and strut.

Referring first to FIG. 1, there is shown a conventional aircraft nacelle indicated at 18 which includes a jet engine, such as a Pratt & Whitney PW4000, indicated at 20 (shown in hidden lines) supported by a strut 22 on a wing 24 (only a portion of which is shown). The nacelle 18 includes a nose cowl 26, a fan cowl 27, a thrust reverser sleeve 28, a core cowl 30 and nozzle exhaust 32. Although some of these components are made up of two mirror image parts split vertically in a clamshell arrangement, each component will be referred to herein as being one piece.

Figure 2:
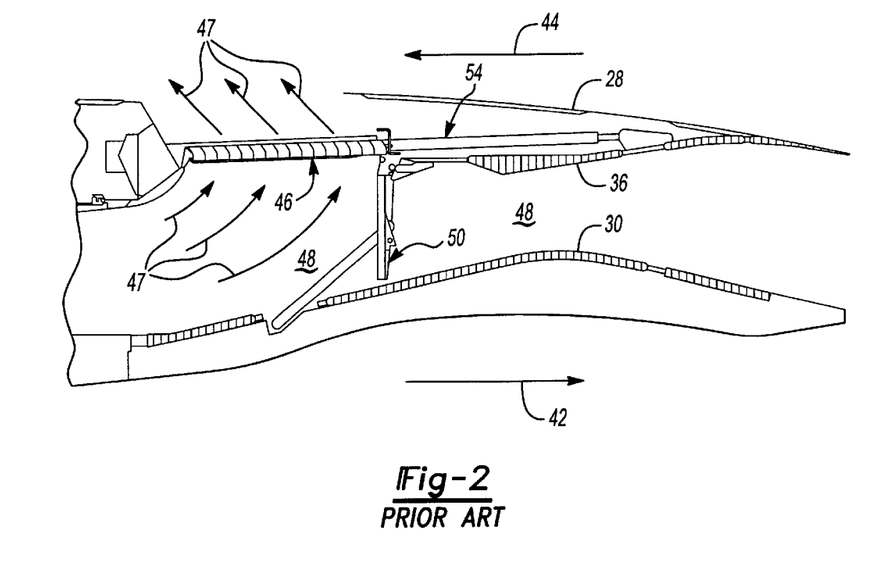
FIG. 2 is a side sectional view of a conventional thrust reverser system.
Figure 3:
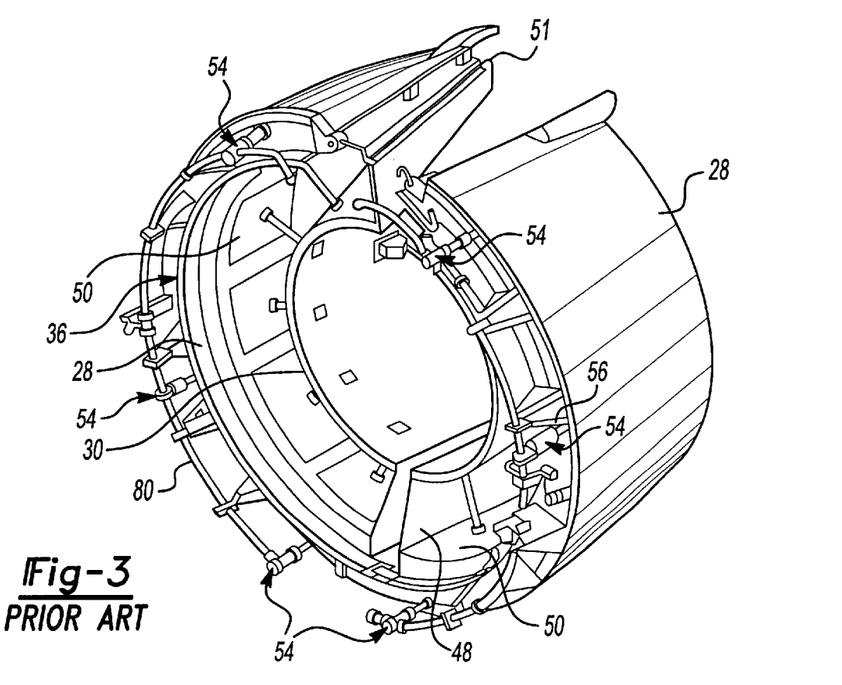
FIG. 3 is an isometric view of a conventional thrust reverser system.

As shown in more detail in FIGS. 2 and 3, the thrust reverser system includes an inner duct (fan duct cowl) 36 and outer sleeve 28. The sleeve 28 translates in an aft direction indicated by an arrow identified by a number 42 in FIG. 2, and a forward direction indicated by an arrow identified by a number 44. When the thrust reverser is deployed, the translating sleeve 28 moves aft from a "stowed" position shown in FIG. 1 to a "deployed" position shown in FIG. 2. In this process, cascade vanes 46 (FIG. 2) mounted to a thrust reverser support structure are uncovered. Vanes 46 are slanted in a forward direction so that during thrust reverser operation, fan air from the engine is redirected forward through the vanes (indicated by arrows 47) to aid in decelerating the airplane.

Air driven aft by the engine fan flows along an annular duct 48 (FIGS. 2 & 3) formed by the fan duct cowl 36 and core duct cowl 30. Movement of the sleeve 28 in the aft direction, causes blocker doors 50 to pivot from their stowed positions (shown in FIG. 3) to their deployed positions (shown in FIG. 2) where the doors are positioned to block rearward movement of the air through duct 48. In this manner all rearward movement of the engine fan air is redirected forward through the cascade vanes 46.

Figure 4:
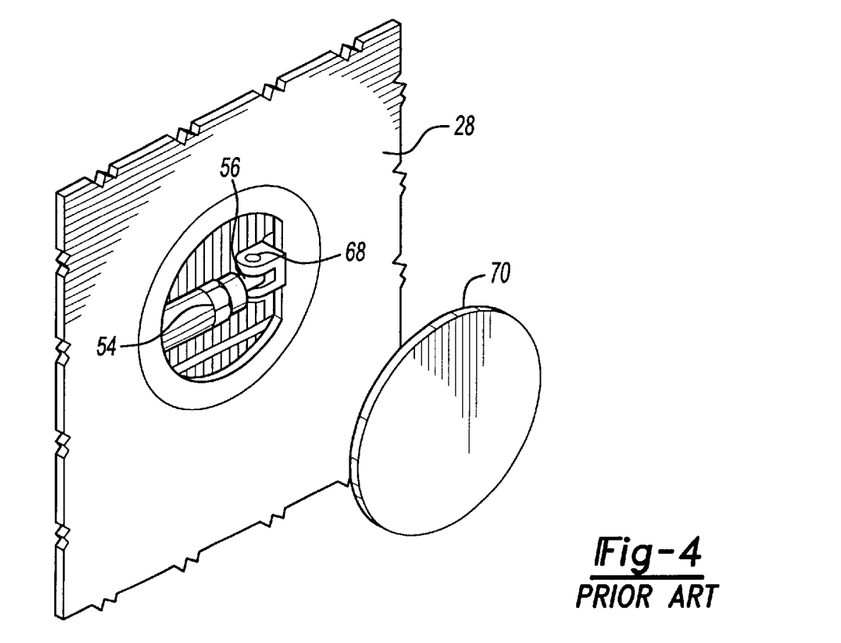
FIG. 4 is a partial view of a conventional thrust reverser sleeve showing an access port located on the sleeve.
Figure 5:
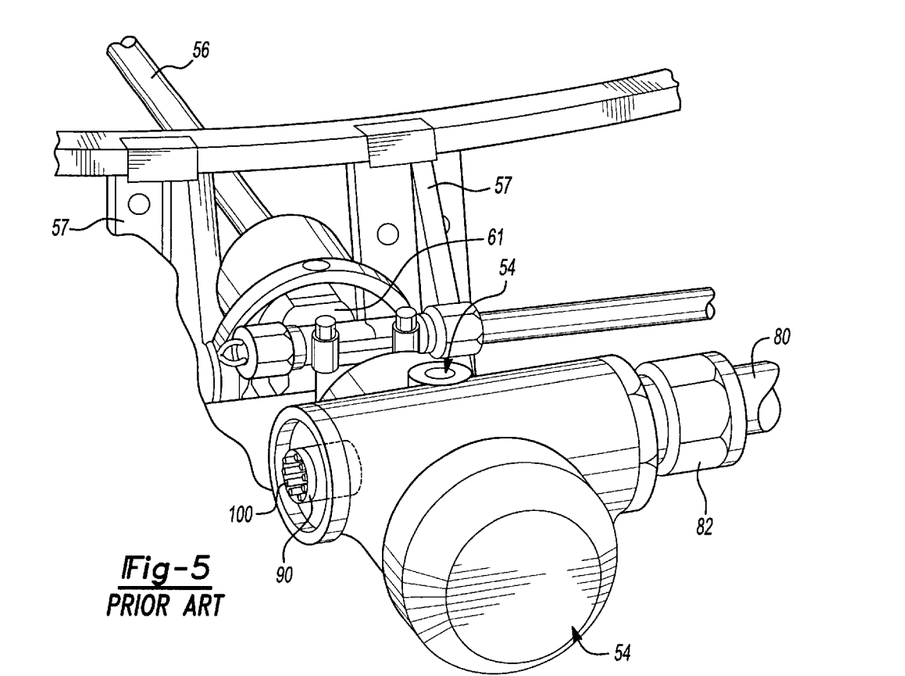
FIG. 5 is an isometric view of a conventional thrust reverser actuator.
Figure 6:
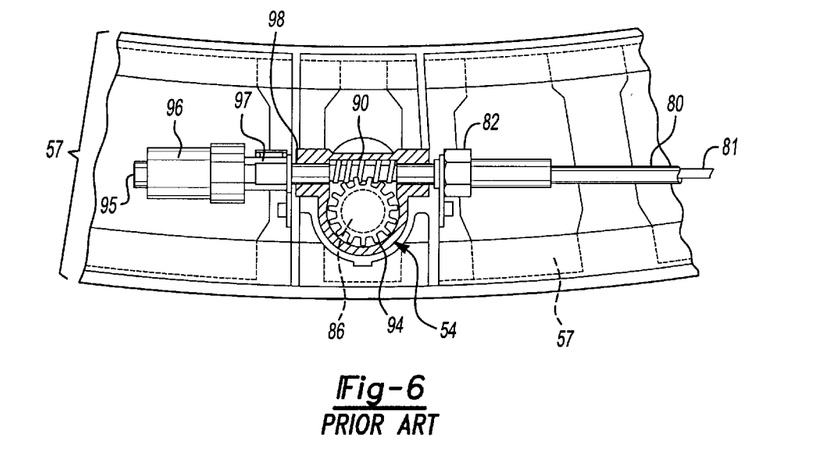
FIG. 6 is a side view of the conventional thrust reverser actuator shown in FIG. 5.

Movement of the sleeve 28 is guided along a pair of parallel tracks mounted to the top and bottom of the fan duct cowl 36 in a fore and aft direction. The sleeve 28 is moved between the stowed and deployed positions by means of a number of hydraulic actuators indicated at 54 (FIG. 3), each having an actuator rod 56 which is connected to the sleeve 28. More specifically, as shown in FIGS. 5 and 6, each actuator 54 is connected to a structural torque box 57 via a gimbal mount 61 thereby allowing the actuator to accommodate lateral variances in sleeve motion. As shown in FIG. 4, the actuator rod 56 is located inside the aerodynamic surface of sleeve 28 and is connected to the sleeve 28 by a ball joint 68. The ball joint 68 is accessible by removing a panel 70 which is bolted to the exterior surface of the sleeve 28.

In operation, when the thrust reverser is commanded by the pilot to the deployed position, each actuator rod 56 (FIG. 5) extends in the aft direction. Conversely, when the thrust reverser is commanded by the pilot to move to the stowed position, each actuator rod 56 retracts in the forward direction. In an exemplary embodiment, the actuator 54 is a thrust reverser actuator currently installed on Boeing 767 airplanes.

Figure 7:
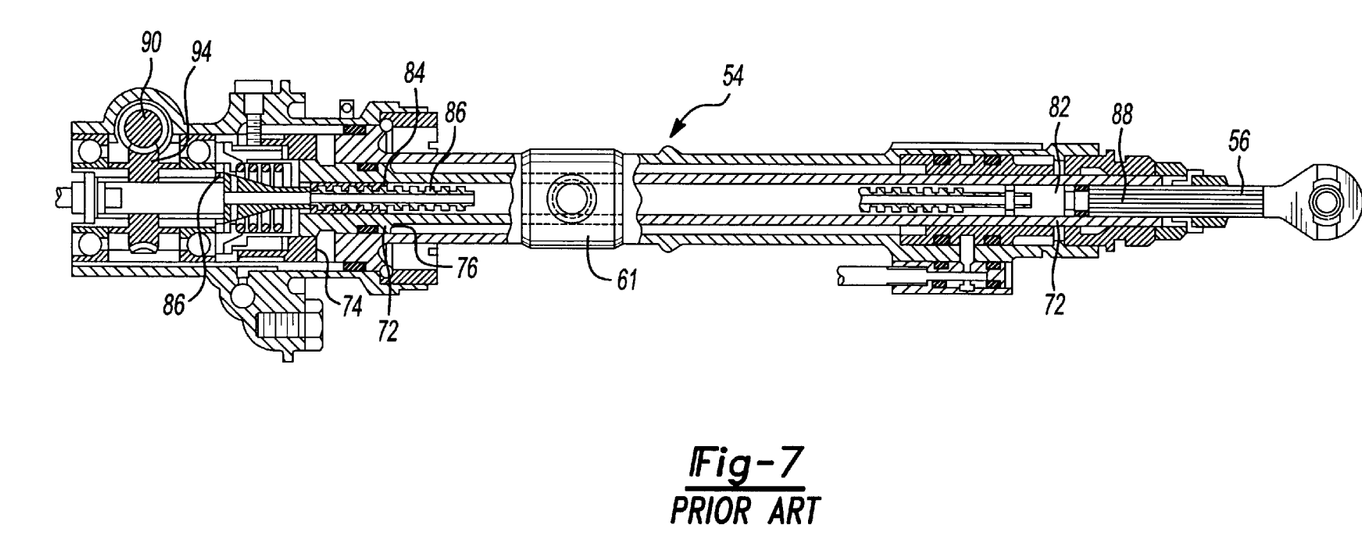
FIG. 7 is side sectional view of the thrust reverser actuator shown in FIGS. 5 and 6.

As shown in FIG. 7, each actuator 54 includes a double acting piston 72 which is extended in the rightward direction (with reference to FIG. 7) by hydraulic pressure acting against a face 74 of the piston 72. Retraction of the piston 72 and the thrust reverser sleeve therewith is accomplished by relieving hydraulic pressure from the piston face 74, so that hydraulic pressure acting against an opposing face 76 of the piston causes it to move in the leftward direction. The piston 72 is connected to the actuator rod 56 which in turn is connected to the thrust reverser sleeve 28 in the manner described previously.

In the exemplary embodiment, each thrust reverser sleeve is driven by three of the actuators 54 (FIG. 3). It is important that each actuator 54 extend and retract the sleeve at the same rate to avoid causing the sleeve to bind along the tracks 51. To accomplish this, operation of each of the three actuators 54 is synchronized by means of an interconnecting synchronizing shaft 80. The sync shaft 80 (FIGS. 5 and 6) is a tube having a stationary outer sleeve and an internal rotating flexible shaft 81 which synchronizes motion of the three actuators. The outer sleeve of the sync shaft 80 is connected to the actuator 54 by a swivel coupling 82.

Thrust reversers include various redundant anti-deployment mechanisms to prevent in-flight deployment, such as locking actuators, non-locking actuators, synchronization shaft locks (sync lock), and auto-restow systems. Thrust reversers presently used on Boeing aircraft have three levels of anti-deployment mechanisms. For example, thrust reversers used on wide body aircraft illustratively have two locking actuators per nacelle and one sync lock per nacelle. Thrust reversers used on narrow body aircraft illustratively have one locking actuator per nacelle, one sync lock per nacelle, and an auto-restow system per nacelle.

It is an object of this invention to provide a hook latch antideployment system that can be used as one of the levels of anti-deployment mechanisms on thrust reversers.

SUMMARY OF THE INVENTION

A hook latch antideployment system for a thrust reverser having at least one thrust reverser sleeve that translates between a deployed and stowed positions and a thrust reverser actuation system that translates the thrust reverser sleeve. The thrust reverser has a stationary element that remains stationary with respect to the thrust reverser sleeve when the thrust reverser sleeve translates. The hook latch anti-deployment system has a hook latch a hook member and a latch member. One of the hook and latch members is coupled to the thrust reverser sleeve for translation therewith and the other of the hook and latch members is affixed to the stationary element of the thrust reverser. The hook member engages the latch member when the thrust reverser sleeve is in its stowed position to prevent deployment of the thrust reverser sleeve. The hook latch system further includes a release mechanism coupled to the thrust reverser actuation system that releases the hook member from the latch member when the thrust reverser actuation system is actuated to deploy the thrust reverser sleeve to its deployed position.

In an embodiment, the hook member coupled to the thrust reverser sleeve for translation therewith. The hook member has a hook cam extending from a forward facing side and a latch cam on a bottom side. The latch cam has a concave aft facing portion and a forward facing ramped portion. An actuator is affixed to the stationary element of the thrust reverser. The actuator has a shaft that it extends aftly when the actuator is actuated and actuator a retraction spring that retracts the actuator shaft when the actuator is deactuated. The shaft of the actuator has a roller at an aft end of the shaft that is hooked by the hook cam when the thrust reverser sleeve is in a stowed position and the hook-latch system is in a locked position. A clevis latch has a clevis latch roller at an aft end that is received in the concave aft facing portion of the latch cam when the thrust reverser sleeve is in the stowed position and the hook-latch system is in a locked position. The actuator is coupled to the thrust reverser actuation system wherein the actuator is actuated upon actuation of the thrust reverser actuation system to translate the thrust reverser sleeve aftly to a deployed position. The extension of the actuator shaft upon actuation of the actuator cams the hook cam to cam the hook member to a release position where the latch cam can roll over the clevis latch roller and the hook cam can release from the roller at the aft end of the actuator shaft as the thrust reverser sleeve translates aft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 8:
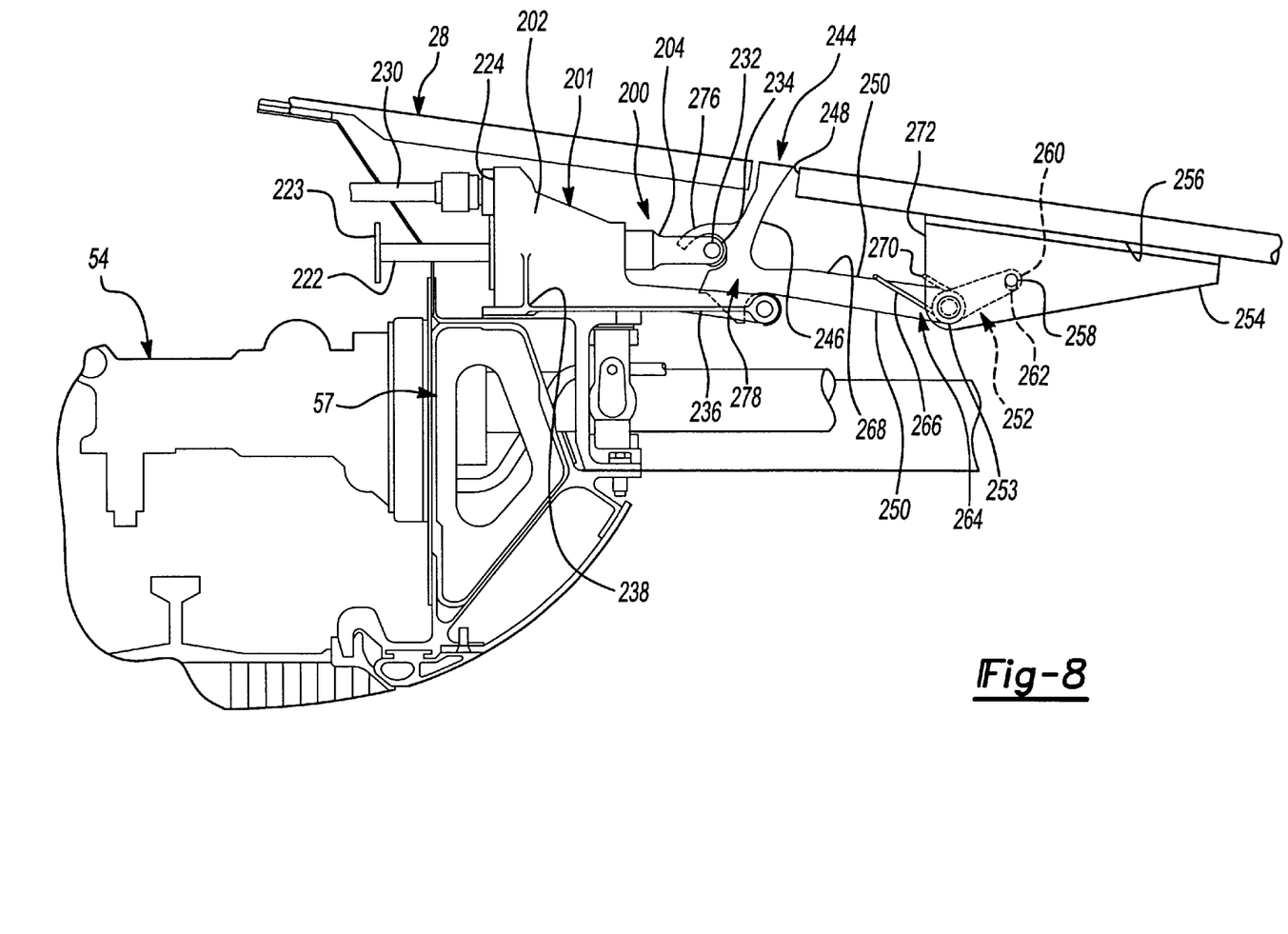
FIG. 8 is a side view of a hook latch antideployment system in accordance with the invention in the lock position.
Figure 9:
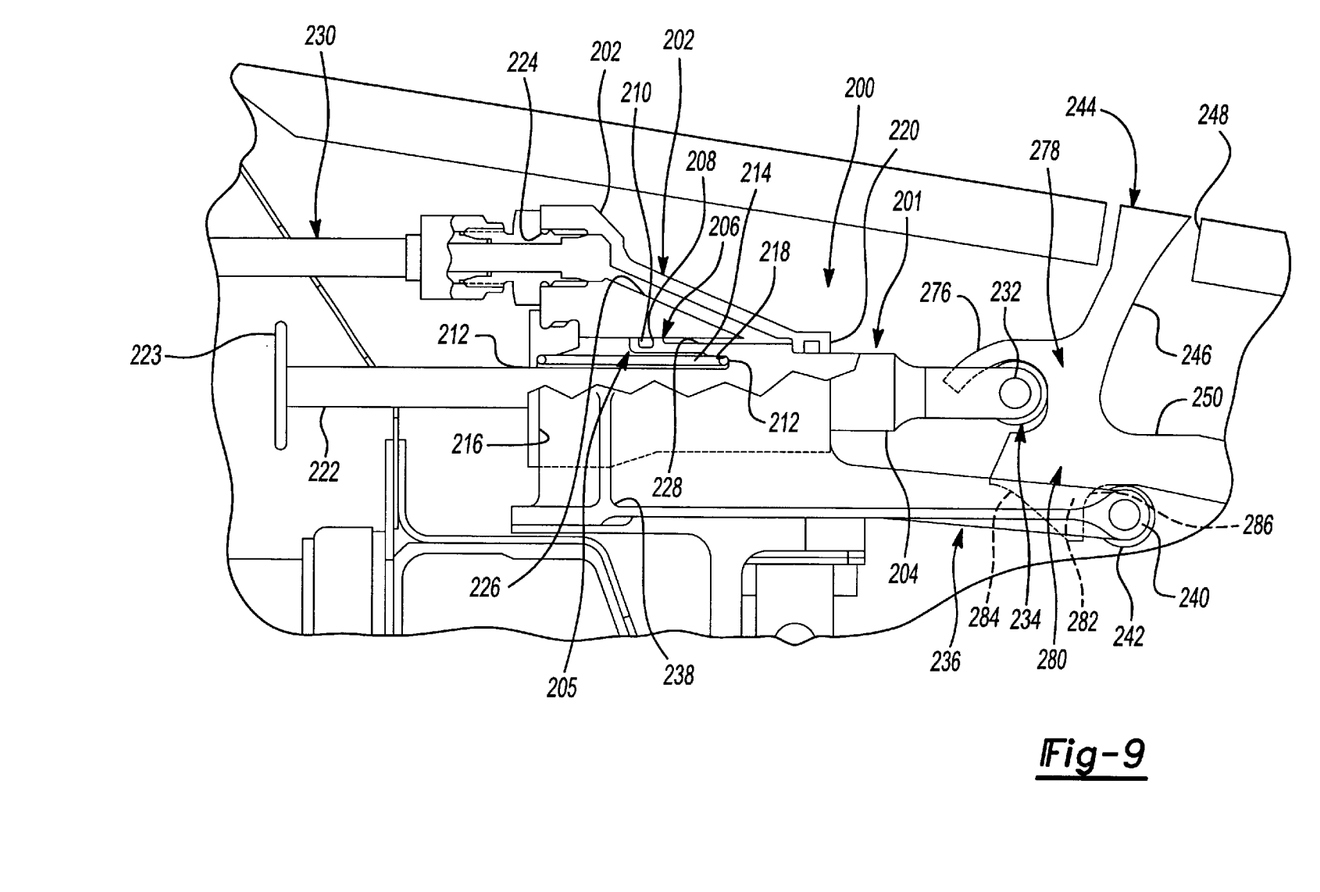
FIG. 9 is an enlarged side view of the hook latch antideployment system in accordance with the invention in the lock position.

With reference to FIGS. 8 and 9, a hook latch antideployment system or mechanism 200 in accordance with the invention is shown. Hook latch system 200 has an actuator 201 having a housing 202 that is affixed to a stationary (with respect to the thrust reverser sleeve 28) element of the thrust reverser, such as torque box 57. Actuator 201 is illustratively a single action hydraulic actuator having a shaft 204 extending axially out through a back wall 220 of housing 202. Shaft 204 terminates at a first end 205 within housing 202 at a piston 206. Piston 206 illustratively can be formed as part of shaft 204 or be a separate part that is affixed to shaft 204. Piston 206 has an annular groove 208 in which an O-ring seal 210 is received. A return spring 212 is received in a bore 214 in shaft 204 that extends part way into shaft 204 from first end 205 of shaft 204. Return spring 212 extends between a front wall 216 of housing 202 and an end wall 218 in shaft 204 at which bore 214 terminates. A manual release knob 223 has a shaft 222 that extends into bore 214 of shaft 204 through return spring 212 from outside of the front wall 216 of housing 202 and is affixed to shaft 204.

Actuator 201 further includes a hydraulic port 224 in housing 202 and a hydraulic passageway 226 extending from hydraulic port 224 to a cylindrical chamber 228 surrounding shaft 204 between piston 206 and back wall 220 of housing 202. A hydraulic supply line 230 from the thrust reverser actuation system (not shown) is coupled to hydraulic port 224. Shaft 204 has, at an aft end 232, a roller 234. A clevis latch 236 extends axially aftwardly from a bottom 238 of housing 202. Clevis latch 236 has, at an aft end 240, a clevis latch roller 242.

Hook latch system 200 further includes a hook member 244. Hook member 244 is generally L shaped having upwardly extending leg 246 that extends through a hole 248 in thrust reverser sleeve 28 and an aftwardly extending leg 250. An aft end portion 252 of aftwardly extend leg 250 of hook member 244 angles upwardly at 253 within an attachment fitting 254 attached to an inner side 256 of thrust reverser sleeve 28. Aftwardly extending leg 250 of hook member 244 is rotatably mounted to attachment fitting 254 at 253, such as by a hinge pin 255. A tang 258 extends normally from a side of aft end portion 252 facing attachment fitting 254 at an aft end 260 of aftwardly extending leg 250. Tang 258 is received in a slot 262 in attachment fitting 254. Tang 258 and slot 262 cooperate to limit the movement of hook member 244. A hook member return spring 264 is disposed around hinge pin 255 and has a first leg 266 that hooks over a top side 268 of aftwardly extending leg 250 between attachment fitting 254 and upwardly extending leg 246 of hook member 244. Hook member return spring 264 has a second leg 270 that hooks around a front side 272 of attachment fitting 254.

Hook member 244 has an arcuate hook cam 276 that extends forwardly from a lower portion 278 of upwardly extending leg 246. A bottom, front portion 280 of aftwardly extending leg 250 has a latch cam 282 having a ramped front side 284 and a concave aft portion 286. Bottom, front portion 280 is illustratively formed to include latch cam 282, but latch cam 282 could be a separate part affixed to bottom, front portion 280.

In operation, when the thrust reverser sleeve is stowed and locked, as shown in FIGS. 8 and 9, hydraulic pressure in hydraulic supply line has been controlled by the hydraulic system of the thrust reverser actuation system (not shown) so that there is not sufficient hydraulic pressure provided at hydraulic port 244 to overcome the force of return spring 212. Consequently, shaft 204 is maintained in its axially aft extended position by the force of return spring 212 keeping roller 234 at the aft end 232 of shaft 204 trapped within arcuate hook cam 276 of hook member 244. Clevis latch roller 242 of clevis latch 236 is also engaged in concave aft portion 286 of latch cam 282. Engagement of clevis latch roller 242 in concave aft portion 286 of latch cam 282 and roller 234 at the aft end 232 of shaft 204 within arcuate hook cam 276 keeps hook member 244 from moving from its locked position to an unlocked position, keeping hook latch system 200 in its locked condition. With hook latch system 200 in its locked condition, upwardly extending leg 244 extending into hole 248 in thrust reverser sleeve 28 prevents thrust reverser sleeve 28 from moving from its stowed position.

Figure 10:
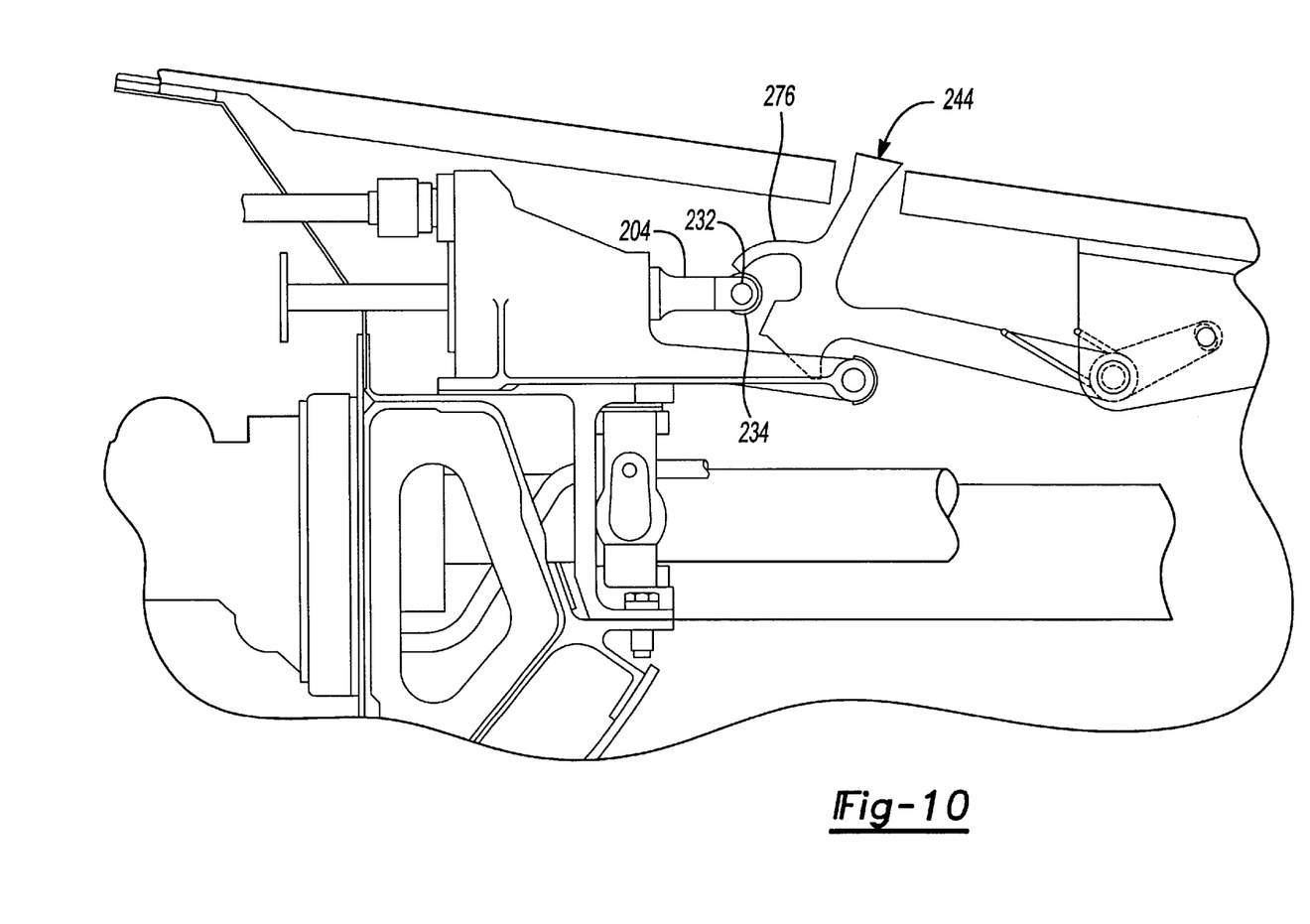
FIG. 10 is an enlarged side view of the hook latch antideployment system in accordance with the invention in the release position.
Figure 11:
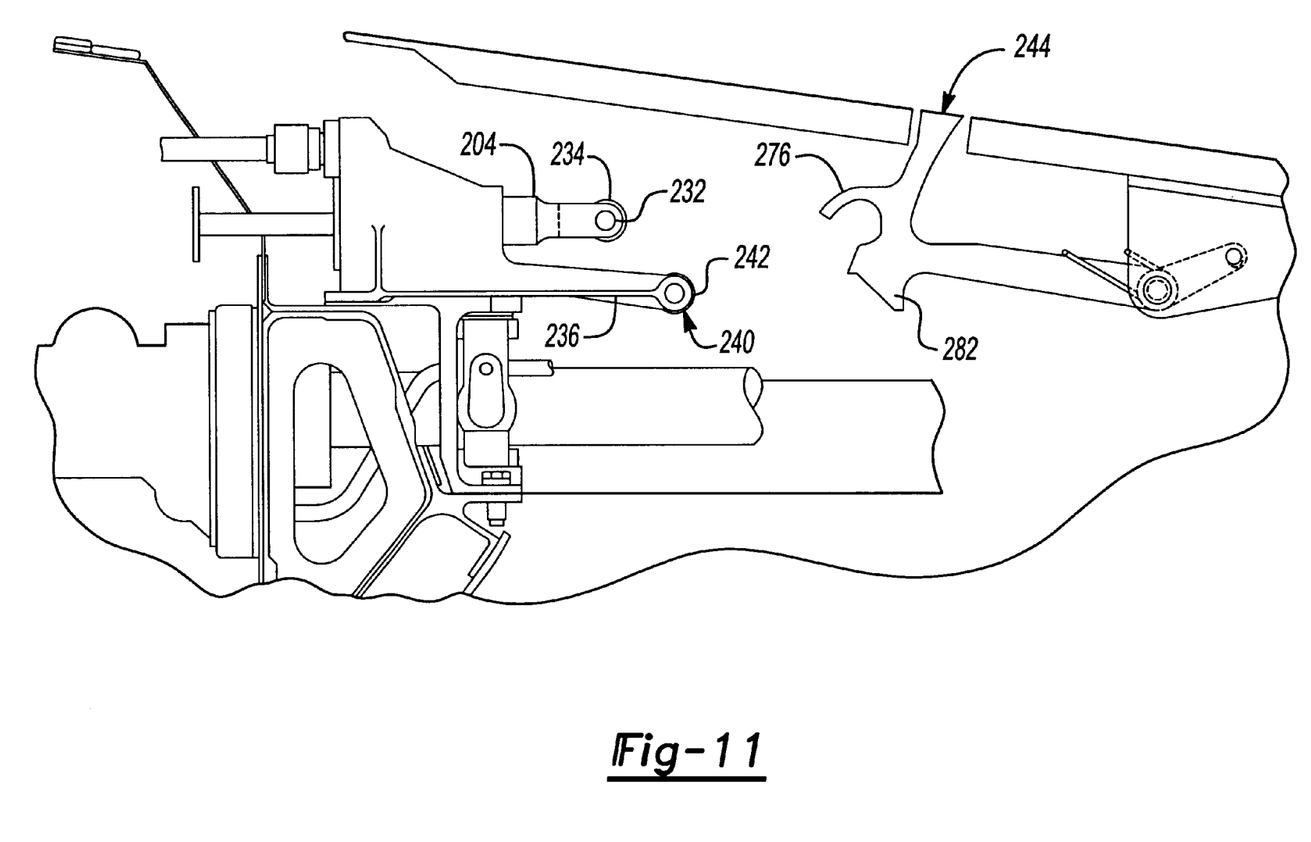
FIG. 11 is an enlarged side view of the hook latch antideployment system in accordance with the invention with the thrust reverser sleeve deployed aft.

When the thrust reverser actuation system is activated to deploy thrust reverser sleeve 28, the hydraulic system of the thrust reverser actuation system is pressurized and pressurized hydraulic fluid provided through hydraulic supply line 230 to hydraulic port 224 and through hydraulic passageway 226 in housing 202 to chamber 228 around shaft 204. The pressurized hydraulic fluid in chamber 228 exerts sufficient force on piston 206 to overcome return spring 212 and retract shaft 204. Retracting shaft 204 causes roller 234 at the aft end 232 of shaft 204 to cam arcuate hook cam 276 upwardly, moving hook member 244 to a release position (as shown in FIG. 10), allowing thrust reverser sleeve 28 to deploy. Further translation of thrust reverser sleeve as it translates to its deployed position, allows latch cam 282 at the bottom front portion 280 of aftwardly extending leg 250 of hook member 244 to roll over clevis latch roller 242 of clevis latch 236. When thrust reverser sleeve 28 is approximately 0.2 inches from its stowed position, upwardly extending leg 246 of hook member 244 protrudes through hole 248 in thrust reverser sleeve 28 providing a visual indication that hook latch system 200 has been unlatched, as shown FIG. 10. As thrust reverser sleeve 28 translates further back to its deployed position, hook member 244 is returned to its normal, retracted position by hook member return spring 264. (FIG. 11) As shown in FIG. 11, with thrust reverser sleeve 28 translated to its deployed position, roller 234 on aft end 232 of shaft 204 is fully disengaged from arcuate hook cam 276 of hook member 244 and clevis latch roller 242 of clevis latch 236 is fully disengaged from latch cam 282 on the bottom, front end portion of aftwardly extending leg 250 of hook member 244.

When the thrust reverser actuation system is translating thrust reverser sleeve 28 to its stowed position, latch cam 282 engages clevis latch roller 242 and begins ramping over clevis latch roller 242. This cams hook member 244 upwardly to enable arcuate hook cam 276 to hook over roller 234 at the aft end 232 of shaft 204 as thrust reverser sleeve 28 approaches it stowed position. When thrust reverser sleeve 28 is approximately 0.2 inches from its stowed position, upwardly extending leg 246 of hook member 244 again protrudes through hole 248 in thrust reverser sleeve 28 providing a visual indication that hook latch system 200 is unlatched, as shown FIG. 10. When thrust reverser sleeve 28 reaches its fully stowed position, clevis latch roller 242 engages concave aft portion 286 of latch cam 282 and arcuate hook cam 276 is hooked over roller 234, locking hook member 244 in its locked position (FIG. 8). If hook latch system 200 fails to fully lock, locking hook member 244 will not have fully returned to its locked position leaving upwardly extending leg 246 of hook member 244 protruding through hole 248 in thrust reverser sleeve 28 thus providing a visual indication that hook latch system 200 has not fully locked.

Manual release knob 223 provides for manual unlocking of hook latch system. Manual release knob 223 is pulled forward after manual translation of thrust reverser sleeve 28 is initiated to manually retract shaft 204 of actuator 201, which allows hook latch system 200 to unlock in much the same manner as described above.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. In a thrust reverser having at least one thrust reverser sleeve that translates between a deployed and stowed positions and a thrust reverser actuation system that translates the thrust reverser sleeve, the thrust reverser further including a stationary element that remains stationary with respect to the thrust reverser sleeve when the thrust reverser sleeve translates, a hook-latch anti-deployment system comprising:

(a) a hook member coupled to the thrust reverser sleeve for translation therewith;

(b) a latch member coupled to the stationary element of the thrust reverser, the latch member engaging the hook member when the thrust reverser sleeve is in its stowed position to prevent the thrust reverser sleeve from moving from its stowed position;

(c) an actuator coupled to the thrust reverser actuation system and to the latch member, the actuator releasing the hook member from the latch member when the thrust reverser actuation system is actuated to deploy the thrust reverser sleeve to the deployed position, wherein the actuator has a shaft having a roller at an aft end, the hook member having an arcuate hook cam in which the roller at the aft end of the shaft is received when the thrust reverser sleeve is in the stowed position and the hook latch anti-deployment system is in a locked position; and upon actuation of the actuator when the thrust reverser actuation system is actuated to extend the thrust reverser sleeve to the deployed position, the actuator retracts the shaft, the roller at the aft end of the shaft of the actuator acting upon the arcuate hook cam of the hook member cams the hook member to a release position.

2. The system of claim 1, and further including a latch clevis, the latch clevis coupled to the fixed element and extending aft therefrom, the latch clevis having a roller cam follower at an aft end, hook member having a latch cam having concave aft facing portion, the roller cam follower of the latch clevis received in the concave aft facing portion of the latch cam when the hook latch system is in the locked position, wherein upon the hook member being cammed to a release position, the latch cam is moved away from the roller cam follower of the latch clevis allowing the roller cam follower to roll over the latch cam as the thrust reverser sleeve translates aft.

3. The system of claim 2 wherein the actuator comprises a single-action hydraulic actuator.

4. The system of claim 1, wherein the hook member includes a leg that protrudes through a hole in the thrust reverser sleeve when the hook member is not engaged with the latch member and the thrust reverser sleeve is at or near to its stowed position providing a visual indication that the system is not locked.

5. A hook-latch antideployment mechanism for a thrust reverser sleeve, comprising:

(a) a hook member coupled to the thrust reverser sleeve for translation therewith;

(b) the hook member having a hook cam extending from a forward facing side and a latch cam on a bottom side;

(c) the latch cam having a concave aft facing portion and a forward facing ramped portion;

(d) an actuator affixed to a stationary element of the thrust reverser, the actuator having a shaft that retracts when the actuator is actuated, the actuator having a return spring that returns the actuator shaft when the actuator is deactuated;

(e) the shaft of the actuator having a roller at an aft end of the shaft that is hooked by the hook cam when the thrust reverser sleeve is in a stowed position and the hook-latch system is in a locked position;

(f) a clevis latch having a clevis latch roller at an aft end that is received in the concave aft facing portion of the latch cam when the thrust reverser sleeve is in the stowed position hook-latch system is in a locked position; and (g) the actuator coupled to the thrust reverser actuation system wherein the actuator is actuated upon actuation of the thrust reverser actuation system to translate the thrust reverser sleeve aftly to a deployed positon, the retraction of the actuator shaft upon actuation of the actuator camming against the hook cam to cam the hook member to a release position where the latch cam can roll over the clevis latch roller.

6. The system of claim 5, wherein the clevis latch roller forces the hook member upwardly as cam latch on the bottom of the hook member rolls over the clevis latch roller during the translation of the thrust reverser sleeve forwardly so that the hook cam can hook over the roller at the aft end of the shaft of the actuator as the thrust reverser sleeve translates to its stowed position.

7. The system of claim 6, and further including a return spring coupled to the thrust reverser sleeve and to the hook member that returns the hook member to a normal position from its release position.

8. The system of claim 6, wherein the hook member includes a leg that protrudes through a hole in the thrust reverser sleeve when the hook member has been forced upwardly providing a visual indication that the system is not locked.

* * * * *